(12) United States Patent
Taaghol et al.

(10) Patent No.: US 7,650,428 B1
(45) Date of Patent: Jan. 19, 2010

(54) MOBILE CELLULAR NETWORK SELECTION FROM WIRELESS LAN

(75) Inventors: Pouya Taaghol, San Jose, CA (US); Mike Ritter, Los Altos, CA (US); Nishi Kant, San Jose, CA (US); Puneet Batta, Santa Clara, CA (US)

(73) Assignee: IntelliNet Technologies, Melbourne, FL (US)

( * ) Notice: Subject to any disclaimer, the term of this patent is extended or adjusted under 35 U.S.C. 154(b) by 174 days.

(21) Appl. No.: 10/818,850

(22) Filed: Apr. 5, 2004

Related U.S. Application Data

(60) Provisional application No. 60/460,631, filed on Apr. 4, 2003.

(51) Int. Cl.
*G06F 15/16* (2006.01)
*G06F 12/00* (2006.01)

(52) U.S. Cl. ........................................ 709/245; 455/39

(58) Field of Classification Search ................. 709/245, 709/250; 455/39
See application file for complete search history.

(56) References Cited

U.S. PATENT DOCUMENTS

| | | | | |
|---|---|---|---|---|
| 6,092,178 | A * | 7/2000 | Jindal et al. | 712/27 |
| 6,427,174 | B1 * | 7/2002 | Sitaraman et al. | 709/245 |
| 2003/0119481 | A1 * | 6/2003 | Haverinen et al. | 455/411 |
| 2004/0015725 | A1 * | 1/2004 | Boneh et al. | 713/201 |
| 2004/0066756 | A1 * | 4/2004 | Ahmavaara et al. | 370/328 |

* cited by examiner

*Primary Examiner*—Zarni Maung
(74) *Attorney, Agent, or Firm*—John L. DeAngelis; Beusse Wolter Sanks Mora & Maire, P.A.

(57) ABSTRACT

Methods are provided to enable a roaming Wireless Local Access Network (WLAN) customer to select from multiple PLMNs using a single standard SSID. The methods include addition of a Mobile Country Code (MCC) to the SSID; addition of an MCC and a series of Mobile Network Codes (MNC) to the SSID; and reverse Domain Name Server (DNS) lookup for the gateway IP address through the designated DNS server.

3 Claims, 1 Drawing Sheet

Inclusion of Mobile Country Code (MCC) and Mobile Network Codes (MNC) in SSID

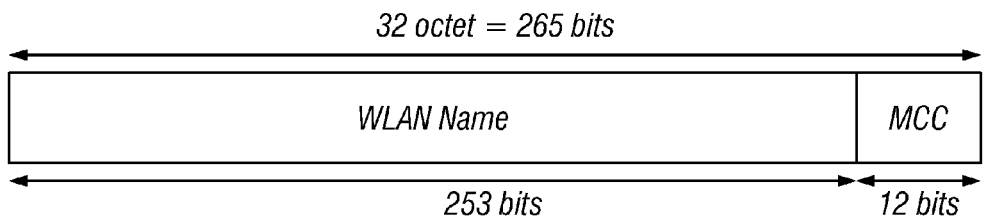
FIG. 1: Inclusion of Mobile Country Code is SSID
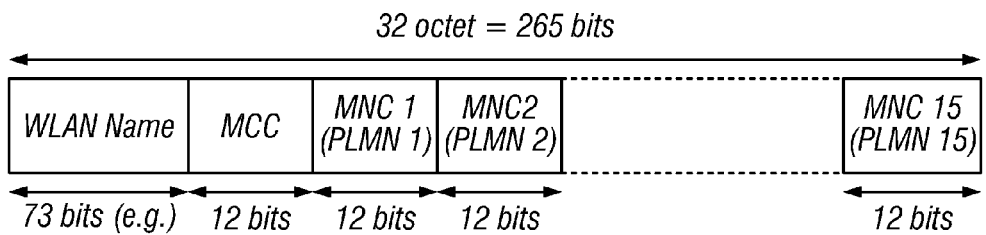
FIG. 2: Inclusion of Mobile Country Code (MCC) and Mobile Network Codes (MNC) in SSID
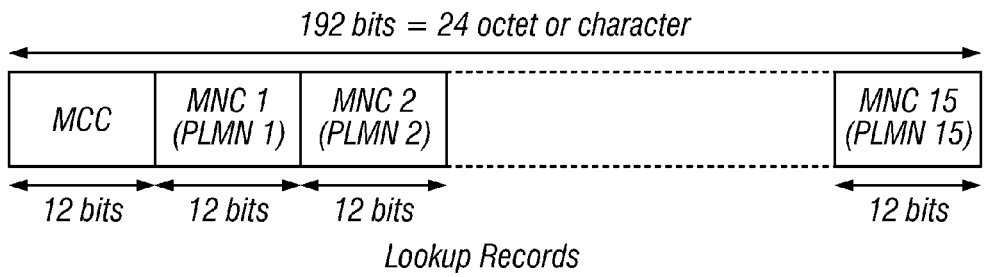
FIG. 3: Inclusion of Mobile Country Code (MCC) and Mobile Network Codes (MNC) in DNS

MOBILE CELLULAR NETWORK SELECTION FROM WIRELESS LAN

CROSS-REFERENCE TO RELATED APPLICATION

This application claims benefit of priority to U.S. Ser. No. 60/460,631, filed Apr. 4, 2003, the disclosure of which is incorporated herein by reference.

INTRODUCTION

1. Technical Field

The present invention relates to a system for Public Land Mobile Networks (PLMN)/network selection using a single standard Service Set Identification (SSID).

2. Background

The selection of a network is required specifically where a Wireless Local Access Network (WLAN) is connected to multiple Public Land Mobile Networks (PLMN) and the roaming mobile subscriber selects the preferred visited PLMN. Hence, it is also expected that the mobile subscriber contains a list of preferred roaming partners.

A number of solutions have been proposed. One solution was to format the Service Set Identification (SSID) such that a single PLMN can be advertised by an SSID. Since standard Access Points (APs) only support a single SSID, an AP using this solution can advertise only one PLMN. The second solution was based on modifying the AP and WLAN air interface standard, the outcome of which is uncertain.

It therefore is of interest to develop methods for PLMN/ network selection using a single standard SSID.

SUMMARY OF THE INVENTION

Methods are provided to enable a mobile subscriber of a Wireless Local Access Network (WLAN) connected to multiple PLMN to make a selection from among the connections available using a single standard SSID. The methods include addition of the Mobile Country Code (MCC) to the SSID; addition of an MCC and several Mobile Network Codes (MNC) to the SSID; and a reverse Domain Name Server (DNS) lookup for the gateway IP address through the designated DNS server.

BRIEF DESCRIPTION OF THE DRAWINGS

FIG. 1 shows a layout of the bits in an SSID which includes a Mobile Country Code (MCC).

FIG. 2 shows a layout of the bits in an SSID which includes both a Mobile Country Code (MCC) and a series of Mobile Network Codes (MNC).

FIG. 3 shows a layout of the bits in a HostInfo field string which includes both a Mobile Country Code (MCC) and a series of Mobile Network Codes (MNC).

DETAILED DESCRIPTION OF SPECIFIC EMBODIMENTS

The first embodiment of the invention is the addition of a Mobile Country Code (MCC) to an SSID. A WLAN can be connected to multiple PLMNs. The mobile client is assumed to have a list of preferred PLMNs for some countries (home and/or visited). In every country, there are few PLMN operators (maybe up to 15). In this first embodiment, it is proposed that a short country code be included somewhere in the SSID of the WLAN APs (see FIG. 1). This country code will help the mobile client speed up the process of finding the preferred PLMN. The mobile client will identify the preferred and present PLMN by "trying connection" to each PLMN in its preferred list for the given country (discovered earlier). "Try connection" can be as simple as an attempt for standard DNS name resolution. If the connection attempt to a preferred PLMN fails, the mobile client will try next most preferred PLMN in its preference list for that country. This solution will have the least impact on the SSID present in the WLAN.

The second embodiment is the inclusion of an MCC and an MNC in an SSID. One Mobile Country Code (MCC) and a series of Mobile Network Codes (MNC) may be included in an SSID. The MCC will identify the country and has a length of 3 digits or 12 bits. Each MNC represents the well-known identification for the PLMN connected to the WLAN, and has a length of 2 to 3 digits or up to 12 bits. As an example, if 73 bits are reserved for the WLAN name, then we can accommodate up to 15 PLMN ids on a single standard SSID (see FIG. 2). Once the mobile client has selected the preferred PLMN, it would perform the required procedures to pass its data traffic through the selected PLMN.

The third embodiment is to make no change to the SSID. The SSID can be left intact as desired. Following authentication, the mobile client will obtain an IP address and gateway IP address. The mobile client will try a reverse Domain Name Server (DNS) lookup for the gateway IP address through the designated DNS server. The local DNS server can be configured to return a domain name which could be used for querying DNS again to request for the HostInfo field (HINFO). The HINFO is composed of two strings (RFC 1034). Such strings can be used to list Mobile Country Code (MCC) and the Mobile Network Codes (MNCs) of all the connected PLMNs to the WLAN as shown in FIG. 3.

As shown in FIG. 3, it would only takes 24 octet (character) to represent 15 PLMN operators.

All publications and patent applications mentioned in this specification are indicative of the level if skill of those in the art to which this invention pertains. All publications and patent applications are herein incorporated by reference to the same extent as if each individual publication or patent application was specifically and individually indicated to be incorporated by reference.

The invention now having been fully described, it will be apparent to one of ordinary skill in the art than many changes and modifications can be made thereto without departing from the spirit or scope of the appended claims.

What is claimed is:

1. An efficient method for selecting a public land mobile network (PLMN) in a network system comprising at least one mobile packet based communications device and at least a wireless local access network providing access connectivity to at least one PLMN such as a WLAN network, comprising the steps of:

provisioning a mobile packet based communications device with a list of a plurality of pubic land mobile networks, the public land mobile networks sequentially listed in order of preference associated with a mobile country code;

operating a wireless local access network connected to a plurality of public land mobile networks, the wireless local access network accessible using a plurality of access points, each access point in a country efficiently advertising presence to the communication device using a service set identification and said service set identification when providing connectivity to PLMN's including the wireless local access network name and the mobile country code; and receiving from the communication device one or more try connection messages, each try connection message corresponding to a preferred public land mobile network, the communication device selectively and sequentially transmitting the try connection messages corresponding only to the preferred public land mobile networks associated with the same mobile country code as included in the service set identification.

2. An efficient method for a mobile communication device to connect to a public land mobile network, in a network system consisting of at least one mobile packet based communications device and at least a wireless local access network providing access connectivity to at least one public land mobile network (PLMN) such as a WLAN network, comprising the steps of:

provisioning a mobile packet-based communications device with a list of a plurality of public land mobile networks, the public land mobile networks sequentially listed in order of preference and associated with a mobile country code;

operating a wireless local access network connected to a plurality of public land mobile network, the wireless local access network accessible using a plurality of access points, each access point in a country efficiently advertising presence to the mobile communication device using a service set identification (SSID) and said SSID when providing connectivity to public land mobile networks comprising a wireless local access network name, a mobile country code, and a plurality of mobile network codes, each said mobile network code identifying a public land mobile network within said country; and enabling the mobile packet based communications device to efficiently select the preferred public land mobile network identified by the combination of the mobile country code and the mobile network code, upon comparison with the sequentially ordered list of public land mobile networks.

3. An efficient method for a mobile packet communications device to identify a preferred public land mobile network, in a network system consisting of at least one mobile packet based communications device and at least one wireless local access network providing access connectivity to at least one public land mobile network such as a WLAN network, comprising the steps of:

provisioning a mobile packet-based communications device with a list of a plurality of public land mobile networks, the public land mobile networks sequentially listed in order of preference and associated with a mobile country code and identified by a mobile network code;

operating a wireless local access network connected to a plurality of public land mobile networks, the wireless local access network accessible using a plurality of access points, each access point connected to at least one domain server configured to return a response to a query, said response including an MNC and a plurality of MCC's accessible from the wireless local access network; and enabling the mobile packet communications device to utilize the information contained within the response to establish connectivity with a preferred public land mobile network within a corresponding country by efficiently comparing the received MNC and MCC information against the MNC and MCC of the sequentially ordered preferred list of public land mobile networks configured on the device.

* * * * *